United States Patent [19]

Pletsch et al.

[11] 3,901,047

[45] Aug. 26, 1975

[54] RESILIENT COUPLING

[75] Inventors: Hubert Pletsch, Birkenau-Ni; Klaus Kurr, Weinheim, both of Germany

[73] Assignee: Carl Freudenberg, Weinheim an der Bergstrasse, Germany

[22] Filed: July 6, 1973

[21] Appl. No.: 376,992

[30] Foreign Application Priority Data

July 13, 1972 Germany............................ 2234437

[52] U.S. Cl. ............... 64/11; 64/13; 64/14
[51] Int. Cl. ............................................... F16d 3/17
[58] Field of Search ........... 64/13, 11 R, 27 NM, 14

[56] References Cited
UNITED STATES PATENTS

| | | | |
|---|---|---|---|
| 2,982,118 | 5/1961 | Franceschetti et al. | 64/11 R |
| 3,112,626 | 12/1963 | Barone | 64/11 R |
| 3,238,742 | 3/1966 | Martorana | 64/11 R |
| 3,353,373 | 11/1967 | Schumacher et al. | 64/11 R |

FOREIGN PATENTS OR APPLICATIONS

| | | | |
|---|---|---|---|
| 515,638 | 12/1952 | Belgium | 64/14 |
| 879,632 | 6/1953 | Germany | 64/14 |

*Primary Examiner*—Samuel Scott
*Assistant Examiner*—Randall Heald
*Attorney, Agent, or Firm*—Burgess, Dinklage & Sprung

[57] ABSTRACT

A coupling for joining a drive shaft to a driven shaft comprising an annular, resilient member composed of an elastomeric material and a plurality of rigid tapering connecting elements, said connecting elements being mounted on said annular member, said rigid connecting elements positioned on the periphery of said annular member such that the direction of taper alternates on said periphery of said annular member from one connecting element to another.

11 Claims, 6 Drawing Figures

RESILIENT COUPLING

BACKGROUND OF THE INVENTION

1. Field of the Invention

This invention relates to a coupling of the type employed to join a drive shaft to a driven shaft. More particularly, this invention relates to a resilient coupling for torque transmission which coupling is in an annular form and composed of a resilient material to which is connected a plurality of rigid connecting elements provided with axial bores. The connecting elements are affixed, at least in part, to the periphery of the annular resilient member and on said periphery have a tapering configuration. The direction of taper alternates from one connecting member to another.

2. Discussion of the Prior Art

Numerous couplings for joining driven shafts to drive shafts are known. For instance, it is known to utilize a universal coupling to join a drive shaft to a driven shaft. It is also known to employ couplings whose rigid connecting elements form segments of a circle for this purpose. In these latter couplings the rigid connecting elements are employed to assure a uniform stress of resilient members disposed therebetween when torque is applied. The known resilient couplings are employed generally in machines wherein the drive has a small varying angle of flexure between the drive shaft and the driven shaft such that no great axial displacement in the drive occurs. This is a limitation imposed upon such couplings owing to the fact that the resultant high sheer stresses occasioned by great axial displacement would limit the life of such coupling. Additionally, rotational angular velocity differences have been compensated by these known couplings only to a limited degree by the use of couplings having a resilient member. In such cases only torsional forces created are compensated by resilient coupling.

In torque resilient couplings heretofore employed, it has been experienced that upon flexure, i.e., deflection, as is the case in automotive construction, the center of rotation does not shift. This results in a degree of non-uniformity between the drive shaft and the driven shaft which, in turn, results in vibrations in the vehicle. The torque-resilient coupling of the prior art has not compensated for these vibrations.

It has thus become necessary to employ expensive compensation joints. In addition to the expensive construction, these joints or hinges are subject to a high degree of wear.

It has thus become desirable to provide a coupling which will permit a resilient flange-connection for vibration demping purposes and axial longitudinal compensation. It is also an object of the invention to provide a resilient coupling which, by means of its kinematic behavior, will largely compensate for the rotational angular velocity differences upon flexure between the drive shaft and the driven shaft.

SUMMARY OF THE INVENTION

Broadly, this invention contemplates a coupling for joining a drive shaft to a driven shaft comprising an annular resilient member composed of an elastomeric material and a plurality of rigid tapering elements, said connecting elements mounted on said annular member, said rigid connecting elements positioned on the periphery of said annular member such that the direction of taper alternates on the periphery of said annular member from one connecting element to another. Preferably receiving means are provided for connecting the connecting means to a shaft. This can be either by utilizing an axial bore in each connecting element or by using a single bore in a member which joins connecting elements.

In accordance with this invention there is provided a resilient coupling for the transmission of torque whereby the connecting members are positioned on the face of an annular resilient member and on the periphery thereof. On the periphery the connecting elements have alternating tapering configuration. As a result of the construction of the connecting members, arranged in tapered manner, a shifting of the center of rotation is effected when the coupling joins a drive shaft to a driven shaft. Thus, upon flexure there is provided a synchronization of the drive shaft and the driven shaft. This synchronization is guaranteed at all levels of flexure. As a result of the tapered connecting members arrangement in reverse or on the periphery of the annular member, the detrimental shearing stresses at the bonding face between the resilient elastomeric annular member and the tapered connecting members are transformed into compressive stresses and/or tensile stresses. By transforming such detrimental shearing stresses to compressive and/or tensile stresses at the bonding face, the shearing stresses which were created in prior art resilient couplings are avoided. Therefore, the couplings of the present invention do not have to be designed in such a way that their construction is large enough to be able to further transmit the occurring shearing stresses as was the case with the prior art resilient couplings.

The tapered shape and alternating direction of the taper of the rigid connecting members therefore effect, under flexure, different springing characteristics in the approximately opposite resiliently disposed rigid connecting elements. There is thereby effected an axial shifting of the center of rotation from the center of the coupling during flexure. This produces the desired longitudinal compensation in the axial direction. The stresses on the resilient parts of the coupling is mainly of a tractional and/or compressive nature and additional alternating shear stresses are diminished.

In a preferred embodiment of the present invention a uniform distribution of the forces is provided by tapering the rigid connecting elements radially, i.e., the portion of the connecting element on the face of the annular element is tapered radially.

Thus, whereas in the known resilient couplings a great change in the rotational angular velocity upon flexure was absorbed only by the resilient members, the axial shifting of the center of rotation, in accordance with the invention, effects a displacement of the center of rotation to approximately on the bisector of the angle included between the shaft ends, thereby substantially assuring synchronism.

BRIEF DESCRIPTION OF DRAWINGS

The present invention can be more readily understood and appreciated when reference is made to the accompanying drawings in which.

DESCRIPTION OF PREFERRED EMBODIMENTS

Figure 1:
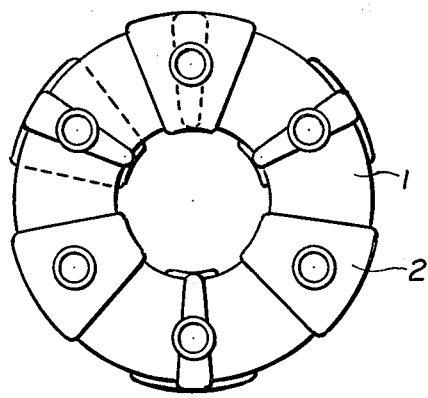
FIG. 1 is a frontal elevation of a resilient coupling of the present invention.
Figure 2:
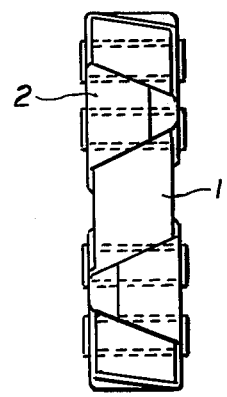
FIG. 2 is a side elevation of the coupling of FIG. 1.

A preferred embodiment of the present invention is illustrated in the annexed drawings. Referring to such drawings, there is shown an annular element 1 composed of a resilient elastomeric material having a center. Disposed along the periphery of the annular element, as shown in FIG. 2, are alternating tapered portions which continue along at least one face portion of the annular element. These rigid, normally metallic, connecting elements are provided with an axially disposed bore to receive a bolt or similar member. The rigid connecting members are preferably shaped on the face portion of the annular member such that they radiate outwardly, as shown in FIG. 1. This feature provides a uniform distribution of the forces occasioned during flexure when the coupling is joining a drive shaft to a driven shaft. The alternating tapering depicted in FIG. 2 is at the heart of the present invention whereby the creation of shear stress is diminished and the transmission of these stresses to compressive and/or tensile stresses is provided. Generally speaking, a coupling of the present invention has at least two rigid connecting members. The density of the resilient elastomeric annular element 1 can vary from between 30 and about 90 shore hardness.

Figure 3:
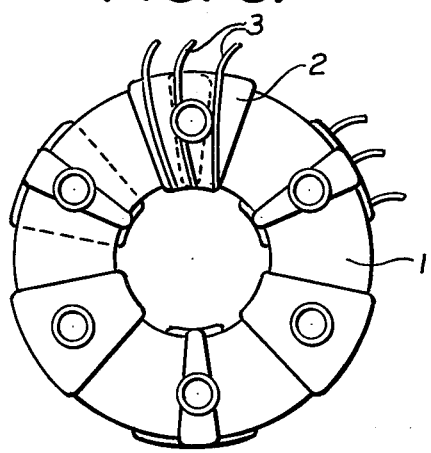
FIG. 3 is a view similar to FIG. 1, showing an embodiment of the invention in which fins or vanes are employed which are attached to the rigid connecting members.
Figure 4:
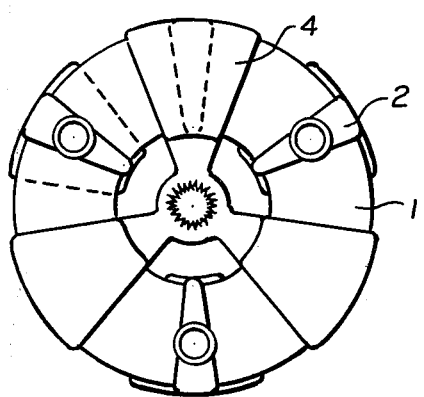
FIG. 4 is a view similar to FIG. 1, showing the connecting members joined together by a central hub which can be opened in the center and is internally toothed.

In FIG. 3 there are shown the connecting elements provided with cooling fins and/or vanes 3. These vanes can be in the form of a plurality of slightly arcuate members radiating outwardly from the surface of the connecting element which is generally in plate form around the periphery of the annular element 1. A preferred embodiment of the invention is shown in FIG. 4 wherein the connecting members are inter-connected at a central hub in general registry with the center of the coupling which center hub can be provided with a generally centrally disposed opening. This centrally disposed opening, in turn, can be internally toothed to receive a correspondingly shaped member of a drive or driven shaft. This assembly saves a flange and provides a simplified arrangement.

Figure 5:
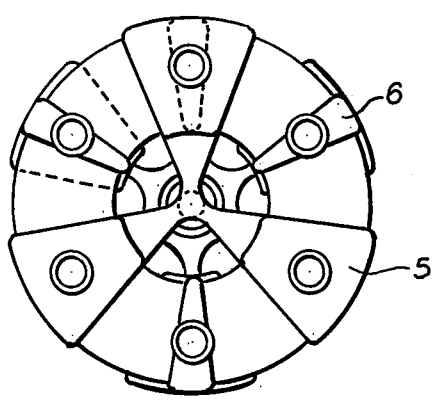
FIG. 5 is a view similar to FIG. 1, showing a star-shaped safety device inter-connecting a plurality of connecting members, each face of the resilient coupling being provided with such a star-shaped safety device.
Figure 6:
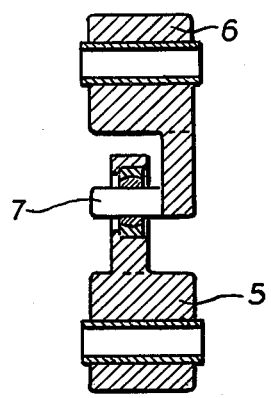
FIG. 6 is a sectional view through the center of the resilient coupling of FIG. 5, showing the respective flange sides 5 and 6 constructed in a star-shaped configuration for receiving a centering device 7.

To prevent a radial deviation of the flange-connected revolving shafts, which would provide an imbalance, star-shaped members shown in FIGS. 5 and 6 can be utilized which are constructed to receive a centering device. This centering device can be mounted in rubber or other resilient material for body sound isolation.

It is preferable to employ the coupling of the invention in a pre-stressed form, i.e., a form in which the coupling is pre-stressed radially and/or axially. This pre-stressed form is made possible by virtue of the tapered shape of the rigid connecting members. The pre-stressed form can provide an increased life for the coupling of the invention. Pre-stressing can be done by selecting the pitch diameter for the bores of the connecting bolts correspondingly larger when the coupling is manufactured. Prior to mounting the coupling, it is compressed to a small diameter and is kept at the desired pitch diameter for installment by means of a mounting strap which is placed around the outside diameter of the coupling. After installation of the coupling, the strap is removed and the coupling is held by bolts in the receiving bores of the coupling. By the alternate arrangement of the tapered connecting elements, it is possible to pre-stress the coupling by axial shifting. This axial pre-stressing has the advantage that, as a result of the alternately arranged connecting elements, the elastomer portion of the annular member is pre-stressed in terms of pressure. This has the effect that, upon flexure, there is produced a shifting of the center of rotation and the desired synchronism between the drive shaft and the driven shaft.

The axial pre-stressing can be provided by providing the individual connecting elements during manufacture with a bevel or notch which will allow mutual displacement with respect to one another. Upon installation of the coupling, the bevel of the connecting elements is brought into the desired position by screwing of the bolts.

The connecting elements can be secured against torsion during assembly.

The assembly of the resilient coupling of the present invention can be carried out by placing, as is known in the art, the normally metallic rigid connecting members in an appropriate manner in a vulcanizing mold and applying the elastomeric material of the annular element 1 to such connecting members under pressure. The elastomeric material can be supplied to the mold in various ways. One way involves introducing the material in the form of unfashioned pieces or blanks. Another way is to inject the elastomeric material by means of a displacement device into the appropriate spaces containing the connecting members. One also can assemble the resilient coupling of the present invention by means of die-casting, known in the art. Elastomeric materials which can be employed to form the annular member include:

What is claimed is:

1. A coupling for joining a drive shaft to a driven shaft comprising an annular resilient member composed of an elastomeric material and a plurality of rigid tapering connecting elements, said connecting elements being mounted on said annular member, said rigid connecting elements positioned on the periphery of said annular member such that the direction of taper alternates on said periphery of said annular member from one connecting element to another, said connecting element being axially and radially tapered.

2. A coupling according to claim 1 having at least two rigid connecting elements.

3. A coupling according to claim 1 wherein the coupling is pre-stressed in the radial direction.

4. A coupling according to claim 1 wherein at least one of said rigid connecting elements has outwardly extending vanes positioned thereon.

5. A coupling according to claim 1 wherein the rigid connecting elements on one face thereof are joined together by a generally star-shaped connecting element which overlies said face.

6. A coupling according to claim 1 wherein the connecting members on one face thereof are joined together by a centrally disposed hub having a receiving means therein.

7. A coupling according to claim 5 wherein the center of said star is in general registry with the center of said coupling.

8. A coupling according to claim 6 wherein the receiving means is internally toothed and is in the form of an opening disposed through said coupling.

9. A coupling according to claim 5 wherein each face of said coupling is provided with a star-shaped member joining alternating rigid connecting elements and the centers of said star-shaped members are joined by a centering device.

10. A coupling according to claim 1 wherein the coupling is prestressed in the axial direction.

11. A coupling according to claim 1 wherein the coupling is prestressed in the radial and in the axial direction.

* * * * *